United States Patent
Acharya et al.

(10) Patent No.: US 7,085,869 B1
(45) Date of Patent: Aug. 1, 2006

(54) ARRANGEMENT FOR MANAGING TRANSMITTED PACKETS REQUIRING ACKNOWLEDGEMENT IN A HOST CHANNEL ADAPTER

(75) Inventors: Yatin R. Acharya, Sunnyvale, CA (US); Bahadir Erimli, Campbell, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 415 days.

(21) Appl. No.: 09/824,706

(22) Filed: Apr. 4, 2001

(51) Int. Cl.
*G06F 13/24* (2006.01)
(52) U.S. Cl. .................. 710/263; 710/112; 370/462
(58) Field of Classification Search ........... 710/263, 710/105, 112, 113, 107, 305, 306, 308, 310; 370/462
See application file for complete search history.

(56) References Cited

U.S. PATENT DOCUMENTS

| | | | |
|---|---|---|---|
| 5,245,616 A * | 9/1993 | Olson | 714/748 |
| 5,687,388 A * | 11/1997 | Wooten et al. | 710/3 |
| 5,862,316 A * | 1/1999 | Hagersten et al. | 714/15 |
| 6,243,778 B1 * | 6/2001 | Fung et al. | 710/113 |
| 6,621,799 B1 * | 9/2003 | Kemp et al. | 370/282 |
| 6,744,765 B1 * | 6/2004 | Dearth et al. | 370/394 |
| 2003/0009581 A1 * | 1/2003 | Herfet et al. | 709/231 |

OTHER PUBLICATIONS

Daniel Cassiday; Sun Microsystem; InfiniBand™ Architecture Tutorial; Hot Chips; Aug. 2000; 79 pages.

* cited by examiner

*Primary Examiner*—Paul R. Myers
*Assistant Examiner*—Clifford Knoll
(74) *Attorney, Agent, or Firm*—Manelli Denison & Selter PLLC; Leon R. Turkevich (57) ABSTRACT

A host channel adapter configured for outputting packets, according to a service protocol requiring acknowledgement messages within a prescribed time interval following transmission, utilizes a retransmission table for storing entries identifying the packets awaiting respective acknowledgment messages during the respective prescribed time intervals. A retransmission manager is configured for updating the retransmission table after each access cycle, defined as a prescribed number of clock cycles. The retransmission manager also identifies a number of transmitted packets within the corresponding access cycle within a selected initial entry for the access cycle. An acknowledgment manager in the receive portion of the host channel adapter resets to zero an acknowledgment waiting bit in a selected entry in response to an acknowledgment message identifying the corresponding packet. If the retransmission manager determines after a prescribed retransmission time that the selected initial entry for the access cycle does not reset an acknowledgment waiting bit, the entries identifying the transmitted packets within the corresponding access cycle are transferred to a transmit queue for retransmission.

13 Claims, 4 Drawing Sheets

Figure 3B

ARRANGEMENT FOR MANAGING TRANSMITTED PACKETS REQUIRING ACKNOWLEDGEMENT IN A HOST CHANNEL ADAPTER

BACKGROUND OF THE INVENTION

1. Field of the Invention

The present invention relates to a host channel adapter configured for communication with target channel adapters, and managing transmitted data packets requiring acknowledgement in an InfiniBand™ server system.

2. Background Art

Networking technology has encountered improvements in server architectures and design with a goal toward providing servers that are more robust and reliable in mission critical networking applications. In particular, the use of servers for responding to client requests has resulted in a necessity that servers have an extremely high reliability to ensure that the network remains operable. Hence, there has been a substantial concern about server reliability, accessibility, and serviceability.

In addition, processors used in servers have encountered substantial improvements, where the microprocessor speed and bandwidth have exceeded the capacity of the connected input/out (I/O) buses, limiting the server throughput to the bus capacity. Accordingly, different server standards have been proposed in an attempt to improve server performance in terms of addressing, processor clustering, and high-speed I/O.

These different proposed server standards led to the development of the InfiniBand™ Architecture Specification, (Release 1.0), adopted by the InfiniBand™ Trade Association. The InfiniBand™ Architecture Specification specifies a high-speed networking connection between central processing units, peripherals, and switches inside a server system. Hence, the term "InfiniBand™ network" refers to a network within a server system. The InfiniBand™ Architecture Specification specifies both I/O operations and interprocessor communications (IPC).

A particular feature of InfiniBand™ Architecture Specification is the proposed implementation in hardware of the transport layer services present in existing networking protocols, such as TCP/IP based protocols. The hardware-based implementation of transport layer services provides the advantage of reducing processing requirements of the central processing unit (i.e., "offloading"), hence offloading the operating system of the server system.

However, arbitrary hardware implementations may result in substantially costly hardware designs. For example, hardware implementation of TCP protocol according to the InfiniBand™ Architecture Specification is accomplished using a host channel adapter (HCA): the HCA provides a reliable service connection (e.g., reliable connection service, reliable datagram service) for a queue pair (QP) by retransmitting a packet if a corresponding acknowledgment is not received within a prescribed time interval following transmission of the packet. Hence, the transmitting HCA needs to keep track of the transmitted packets of a reliable service connection to determine whether an acknowledgment has been received for each corresponding transmitted packet. However, inefficient hardware implementations may result in substantially large memory requirements, increasing the cost of the HCA.

SUMMARY OF THE INVENTION

There is a need for an arrangement that enables a host channel adapter to be implemented in an efficient and economical manner.

There also is a need for an arrangement that enables a host channel adapter to track whether acknowledgment messages have been received for transmitted data packets of a reliable service connection, in an economical and efficient manner.

These and other needs are attained by the present invention, where a host channel adapter configured for outputting packets, according to a service protocol requiring acknowledgement messages within a prescribed time interval following transmission, utilizes a retransmission table for storing entries identifying the packets awaiting respective acknowledgment messages during the respective prescribed time intervals. A retransmission manager is configured for updating the retransmission table after each access cycle, defined as a prescribed number of clock cycles. The retransmission manager also identifies a number of transmitted packets within the corresponding access cycle within a selected initial entry for the access cycle. An acknowledgment manager in the receive portion of the host channel adapter resets to zero an acknowledgment waiting bit in a selected entry in response to an acknowledgment message identifying the corresponding packet. If the retransmission manager determines after a prescribed retransmission time that the selected initial entry for the access cycle does not reset an acknowledgment waiting bit, the entries identifying the transmitted packets within the corresponding access cycle are transferred to a transmit queue for retransmission.

Hence, the retransmission table provides an effective arrangement for tracking packets awaiting acknowledgment messages, while minimizing memory resources within the host channel adapter.

One aspect of the present invention provides a method in a host channel adapter. The method includes first storing in a table, each access cycle by a retransmission manager, entries identifying respective packets having been transmitted during the corresponding access cycle according to a service protocol requiring an acknowledgement message receipt within a prescribed time interval following transmission of the corresponding packet. The method also includes resetting an acknowledgment waiting bit for a selected one of the entries by an acknowledgement manager in response to reception of an acknowledgment message identifying the corresponding packet, and transferring the entries having a determined absence of the reset stored acknowledgment waiting bit upon expiration of the prescribed time interval to a transmit queue for retransmission.

Another aspect of the present invention provides a host channel adapter. The host channel adapter includes a table, a transmit queue, an acknowledgment manager, and a retransmission manager. The table is configured for storing entries identifying packets having been transmitted according to a service protocol, where the service protocol requires an acknowledgment message receipt within a prescribed time interval following transmission of the corresponding packet. Each entry includes a packet identifier, and an acknowledgment waiting bit for identifying whether the corresponding acknowledgment message has been received. The transmit queue is configured for identifying packets to be transmitted, and the acknowledgment manager is configured for resetting the acknowledgment waiting bit for a selected one of the entries identifying reception of an acknowledgment message for the corresponding packet. The retransmission manager is configured for storing in the table, each access cycle, the entries identifying the respective packets having been transmitted during the corresponding access cycle. The retransmission manager transfers the entries having a determined absence of the reset acknowledgment waiting bit upon expiration of the prescribed time interval from the table to the transmit queue.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
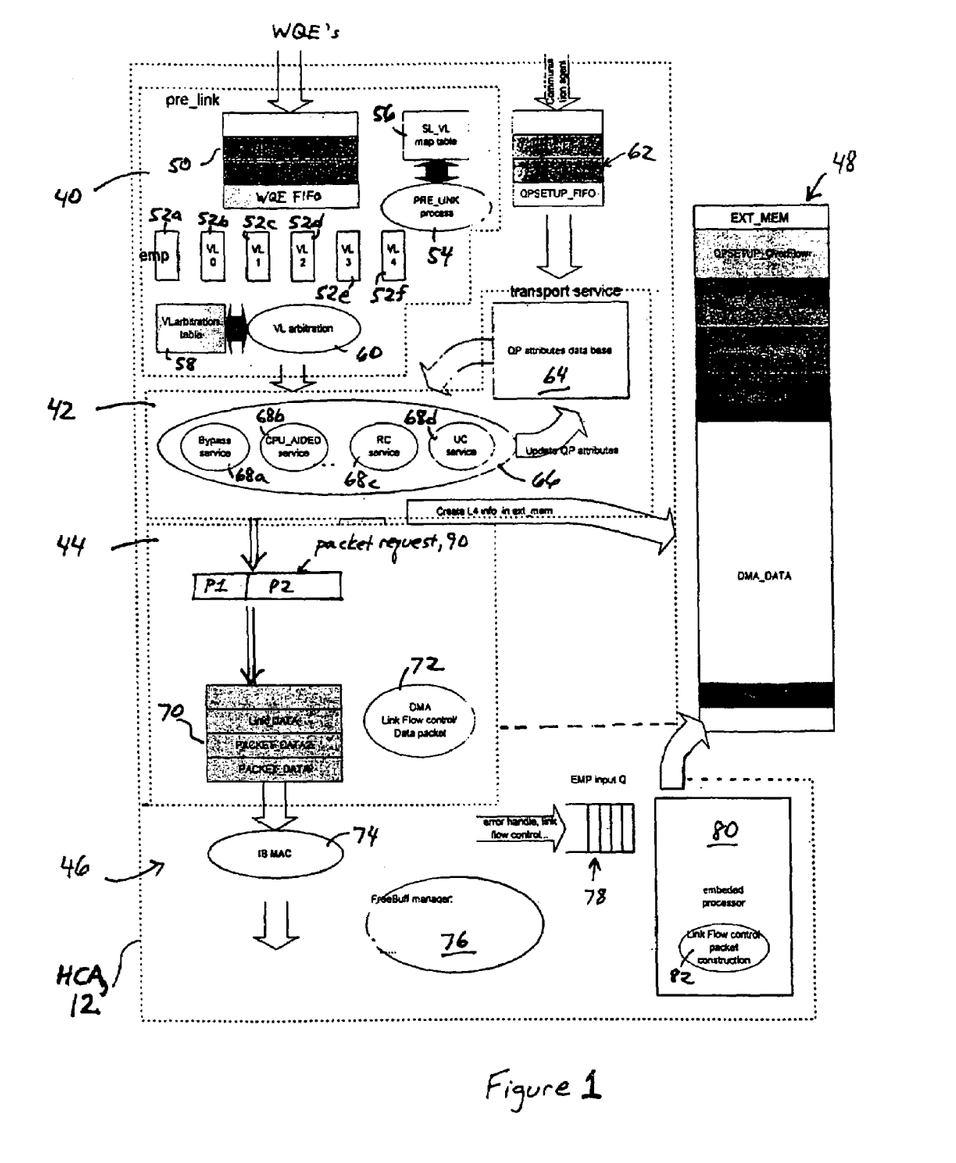
FIG. 1 is a diagram illustrating a host channel adapter configured for generating transmit packets according to an embodiment of the present invention.

FIG. 1 is a block diagram illustrating a host channel adapter (HCA) 12 configured for generating and outputting transmitting packets according to an embodiment of the present invention. The HCA 12, compliant with the InfiniBand™ Architecture Specification, is implemented in a manner that ensures that hardware resources are efficiently utilized by generating transmit packets according to a priority-based ordering. In addition, the disclosed HCA 12 provides flexibility by enabling embedded processes to be added without disruption of traffic flow. Hence, the HCA 12 can be implemented in an economical manner with minimal complexity relative to conventional implementation techniques.

One problem with conventional arrangements for implementing the HCA 12 according to the InfiniBand™ Architecture Specification is that transport layer service would be performed first, for example by constructing a transport layer header, generating a packet sequence number, validating the service type (e.g., reliable connection, reliable datagram, unreliable connection, unreliable datagram, etc.), and other transport layer operations. Once the transport layer operations have been completed, the packet would be sent to the link layer service for link layer operations, including service layer and virtual lane mapping, link layer flow control packet generation, link layer transmission credit checking, and other operations. Although this conventional type of implementation has the advantage of precisely following the network layers specified in the InfiniBand™ Architecture Specification, such an arrangement requires a substantially large amount of hardware. In particular, the transport layer generally requires more processing power than the link layer because the transport layer involves more complex operations. Hence, there is a need that the implementation of the transport layer in hardware does not result in a substantially complex hardware system. In addition, there is a concern with unnecessarily wasting transport layer resources on low priority operations.

According to the disclosed embodiment, link layer operations are partitioned based on the desirability to determine priorities of data packets to be transmitted. In particular, the HCA 12 of FIG. 1 includes a pre-link module configured for determining a priority of received WQEs, and a post-link module configured for preparing a data packet for transmission on the network. The pre-link module 40 orders the WQEs according to priorities determined by the pre-link module, and outputs the WQEs in the determined order to a transport service module 42 configured for generating the appropriate transport layer headers for the WQEs based on the associated queue pair attributes. In other words, the pre-link module 40 prevents the transport service module 42 from wasting resources on low priority WQEs or blocking high priority WQE's within the transport layer process. Hence, higher priority connections obtain improved service at the transport layer through the HCA.

The HCA 12, implemented for example as an application-specific integrated circuit, includes a pre-link module 40, a transport service module 42, a post-link module 44, and a media access control (MAC) module 46. The HCA 12 also has local access to a memory 48 configured for storing transport data and overflow buffers, described below.

The pre-link module 40 includes a work queue element FIFO 50, virtual lane FIFOs 52, a pre-link process module 54, a service layer to virtual lane (SL-VL) mapping table 56, a virtual lane (VL) arbitration table 58, and a virtual lane (VL) arbitration module 60.

The HCA 12 is configured for receiving data from a central processing unit (CPU) in the form of work queue elements (WQEs), stored in the WQE FIFO 50. Each WQE specifies a corresponding request, from a consumer application executed by the CPU (i.e., "requester"), for a corresponding prescribed operation to be performed by a destination InfiniBand™ network node (i.e., "responder"), for example a target. The interaction between requester and responder is specified via a queue pair (QP), where a queue pair includes a send work queue and a receive work queue.

The WQE includes service level (SL) information, and a pointer to the location of the actual message in the system memory 48. The InfiniBand™ Architecture Specification defines a service level (SL) attribute that permits a packet traversing the InfiniBand™ network 10 to operate at one of sixteen available service levels. Hence, the requester can select an available service level (e.g., quality of service, priority, etc.) based on a selected priority of the WQE.

The pre-link module 40 provides both service level to virtual lane mapping (SL-VL mapping), and virtual lane arbitration. In particular, virtual lanes, defined in the InfiniBand™ Architecture Specification, enable multiple logical flows to be implemented over a single physical link, where link level flow control can be applied to one virtual lane without affecting other virtual lanes. The pre-link process module 54 is configured for managing and maintaining the service layer-virtual layer mapping table 56. In particular, the pre-link process module 54 retrieves a WQE from the WQE FIFO 50, and determines the corresponding virtual lane based on the service layer specified within the WQE. Upon identifying the appropriate virtual lane for the retrieved WQE, the pre-link process module 54 forwards the WQE to the corresponding virtual lane FIFO 52.

The pre-link module 40 includes virtual lane FIFOs 52a, 52b, 52c, 52d, 52e, and 52f for storage of WQEs based on the assignment by the pre-link process module 54. For example, the virtual lane FIFO 52a is used for storing WQEs associated with embedded processor operations, for example link layer control packets and handling of error conditions. In other words, when a prescribed operation is not implemented in hardware, the request is sent to an embedded processor queue 78 for further processing by an embedded processor 80, described below; hence the embedded processor 80 has its own assigned queue 52a for outputting packets into the flow of output data traffic. The virtual lane FIFO 52b is used for storing WQEs associated with management traffic. The virtual lane FIFOs 52c, 52d, 52e, and 52f are used for storing WQEs associated with respective assigned virtual lanes. Although the disclosed embodiment discloses the use of four assigned virtual lanes, additional virtual lane FIFOs may be added for additional assigned virtual lanes.

The VL arbitration module 60 is implemented as a state machine with registers, and is configured for managing the VL arbitration table 58 for servicing of the virtual lanes, including setup, management, and teardown of the virtual lanes. The VL arbitration module 60 also determines which virtual lane to service, and outputs the WQEs from the virtual lane FIFOs 52 based on the determined priority of the virtual lanes. For example, the virtual lane FIFO 52b typically stores management (high-priority) traffic, hence the VL arbitration module 60 typically would empty the virtual lane FIFO 52b before servicing the other virtual lane FIFOs 52c, 52d, 52e, or 52f. The VL arbitration module 60 would then selectively output the WQEs from the virtual lane FIFOs 52c, 52d, 52e, or 52f based on weighted priorities stored in respective weight tables within the VL arbitration table 58.

Hence, the pre-link module 40 outputs the WQEs in a prescribed order based on a determined priority of the WQEs, for example based on assigned virtual lanes, or whether the WQE is for an embedded process, management traffic, or flow control traffic.

The transport service module 42 is configured for managing transport services, including setup, management, and teardown of queue pairs. In particular, the HCA 12 includes a queue pair setup FIFO 62 configured for storing queue pair commands received from a communication management agent. The communication management agent is responsible for setup and teardown of transport connections: the communication management agent communicates with a subnet manager to establish the transport connections (i.e., queue pairs) for the HCA 12. In addition, the communication management agents at each end during connection establishment use a bypass service (described below with respect to bypass service submodule 68a), as opposed to a conventional transport layer service, to establish the transport connections.

The transport service module 42 includes a queue pair attributes database 64 and a queue pair attributes management module 66. The queue pair attributes management module 66 is configured for processing the queue pair commands in the queue pair setup FIFO 62, and updating the queue pair attributes database 64 based on the received queue pair commands. For example, the queue pair attributes database 64 stores information relating to a source queue pair number, a destination queue pair number, and possibly source agent and destination agent. Hence, the queue pair attributes database 64 will include all information necessary to support the different transport services, including reliable connection service, reliable datagram service, unreliable connection service, unreliable datagram service, and raw datagram service.

The queue pair attributes management module 66 manages the transport services by updating the queue pair attributes database 64 during communication between the local and remote communication agents, for example when packet sequence numbers increase as messages are exchanged between the local and remote communication agents. Additional details regarding the teardown of queue pairs are described below with reference to FIG. 2 and FIGS. 3A and 3B.

The queue pair attributes management module 66 also includes service submodules 68, each configured for managing a corresponding transport service type based on a corresponding received WQE from the pre-link module 40. For example, the bypass service submodule 68a is configured for managing bypass services during connection establishment or managing queue pairs associated with management operations with network managers that use, for example, the raw datagram service. The CPU aided service submodule 68b is configured for managing queue pairs based on embedded processor operations using the embedded virtual lane FIFO 52a; hence, the CPU aided service submodule 68b enables coordination between the local and remote embedded processes; moreover, implementation of the CPU aided service submodule 68b in conjunction with the embedded virtual lane FIFO 52a enables messages to be retransmitted if a resend request is received from the remote communication agent. The reliable connection (RC) service submodule 68c and the unreliable connection (UC) service submodule 68d are configured for managing queue pairs associated with reliable connection and unreliable connection transport services, respectively. Although not shown, the queue pair attributes management module 66 also includes submodules 68 for managing reliable and unreliable datagram services, and raw datagram service.

Hence, the transport service module 42, upon receiving a WQE from the pre-link module 40, supplies the WQE to the appropriate submodule 68 for processing (e.g., WQE for RC service handled by the RC service submodule 68c). The WQE includes service level (SL) information, and a pointer to the location of the actual message in the system memory 48. The submodule 68, in response to reception of the appropriate WQE, parses the WQE, and retrieves from the WQE the pointer that identifies the memory location for the transport data (i.e., the payload for the transport layer); the submodule 68 performs a DMA fetch of the transport data, updates the appropriate queue pair attributes within the queue pair attributes database 64, and creates and stores in the external memory 48 a transport layer header for the WQE in a corresponding transport format; for example, the submodule 68a may generate a raw transport header, whereas the modules 68c or 68d may generate a transport header according to the reliable connection service or the unreliable connection service, respectively.

The submodule 68 then creates a header pointer (p1) that identifies the location of the transport layer header. The submodule 68 then sends to the post-link module 44 the payload pointer (p2) and the header pointer (p1) as a packet request 90, enabling the post-link module 44 to assemble the transport packet for transmission based on the supplied pointers. Alternately, the submodule 68 may generate a frame pointer to a system memory location that stores the transport layer frame, including the transport layer header and the transport data. If preferred, the submodule 68 also could forward the transport layer frame (including transport layer header and transport data) to the post-link module. Alternately, while writing to the external memory, the CPU may leave blank spaces at the beginning of the data, so that the actual header information that is created within the modules 68 can be stored in the corresponding empty memory space. The pointer passed down to the post-link module 44 could be this pointer which points to the beginning of the frame in the external memory.

The post-link module 44, in response to reception of the transport layer information (e.g., transport layer frame, packet request, etc.), fetches the transport layer header and the transport layer payload from the system memory 48 for generation of the transmit packet and storage in a transmit FIFO 70. In particular, the post-link module 44 also includes a link layer control module 72 configured for generating the transmit packet by generating link layer fields (e.g., local and global routing headers, cyclic redundancy check (CRC) fields, etc.), storage of the transmit packet in the transmit FIFO 70, and handling link layer control operations according to the InfiniBand™ Architecture Specification. Once the transmit packet has been generated, the pointers are forwarded to the free buffer manager 76, described below.

The link layer control module 72 outputs the transmit packets according to a credit-based flow control. In particular, the link layer control module 72 monitors the available credits for transmission of a transmit packet on the assignment virtual lane. In particular, credits are sent on a per virtual lane basis, where a receiver issues a credit based on packets taken from an incoming virtual lane buffer; the credits are sent to the sender, enabling the sender to manage flow control. Hence, if the link layer control module 72 determines that an identified virtual lane has an insufficient number of credits, the link layer control module 72 defers transmission of the corresponding transmit packet until a sufficient number of credits have been received. If the virtual lane has a sufficient number of credits, the link layer control module 72 forwards the transmit packet to the MAC module 46 for transmission.

The MAC module 46 is configured for outputting the transmit packet stored in the transmit FIFO 70 according to the InfiniBand™ Architecture Specification. In particular, the MAC module 46 includes a transmission module 74, a free buffer manager 76, an embedded processor input queue 78, and an embedded processor 80 having a link flow control packet construction module 82. The transmission module 74 is configured for performing media access control operations, and optionally physical layer transceiver operations, for transmission of the transmit packet onto the InfiniBand™ network 10.

The free buffer manager 76 is configured for releasing available space from the external memory 48 once the transmit packet has been successfully received by the responder. In particular, the memory pointers for a transmit packet are sent from the post-link module 44 once the transmit packet has been generated; if a responder sends a message that the transmit packet needs to be resent in a reliable connection service, the transmit packet can be regenerated by the post-link module 44 and retransmitted to the responder. Once the transmit packet is successfully received, the frame pointers can be released for use by another agent. Additional details describing the retransmission operation is described below with reference to FIGS. 2 and 3.

Flow control is handled by the embedded processor 80 based on reception of information from the embedded processor input queue 78: in particular, the flow control protocol according to the InfiniBand™ Architecture Specification uses a credit-based flow control. The embedded processor 80 generates link flow control packets using the link flow control packet construction module 82, based on messages stored into the embedded processor input queue 78. The embedded processor 80 writes the link flow control packet to external memory 48; the embedded processor 80 then generates a WQE that includes the associated operation and a pointer specifying the location of a flow control packet into the embedded processor virtual lane FIFO 52a. The link flow control packet can then be output, specifying a number of available credits for another transmitting note.

Hence, the embedded processor 80 can generate a link flow control frame including the flow control header, and output the link flow control frame to the error processor input queue 78 for transmission to the network.

Figure 2:
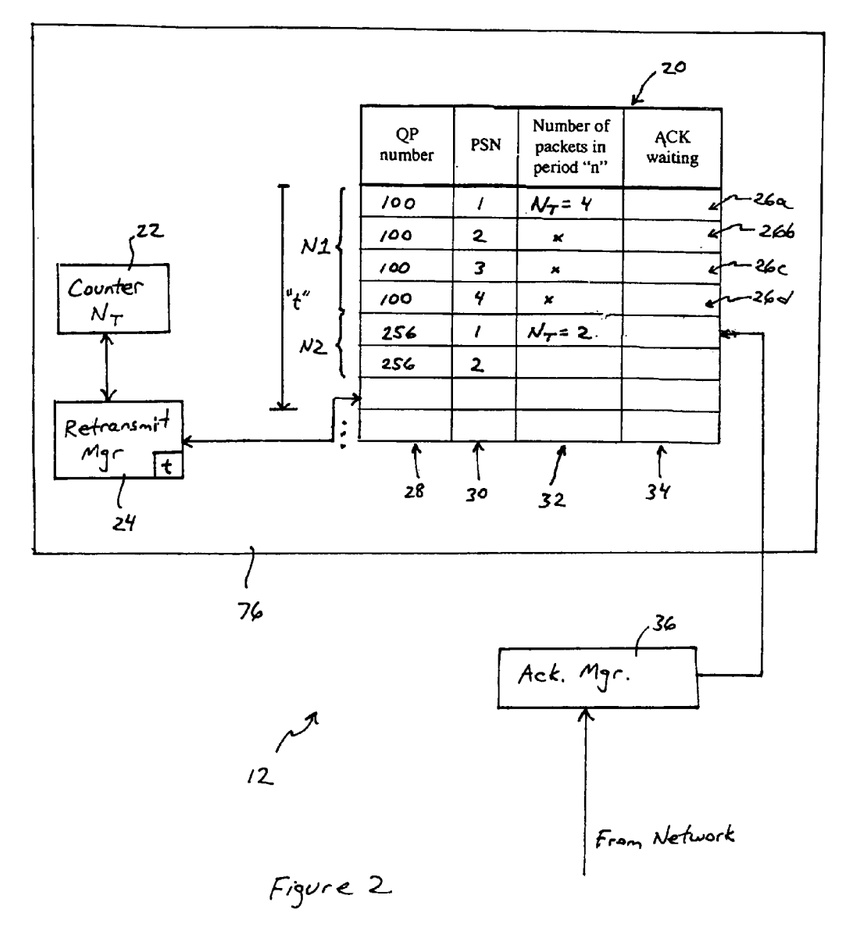
FIG. 2 is a diagram illustrating in further detail the free buffer manager 76, also referred to as the retransmission module, according to an embodiment of the present invention.

FIG. 2 is a diagram illustrating in ftuther detail the free buffer manager 76, configured for selectively controlling retransmission of selected packets sent according to a reliable service protocol (e.g., reliable connection service or reliable datagram service) according to an embodiment of the present invention. The free buffer manager 76, also referred to as a retransmission module, is configured for monitoring whether a packet transmitted according to a reliable service protocol needs to be retransmitted by the post-link module 44 and the MAC 74.

The retransmission module 76 includes a retransmission table 20, a counter 22, and a retransmission manager 24. The retransmission table 20 includes entries 26 that identify respective packets having been transmitted according to a service protocol requiring acknowledgment within a prescribed time interval (t), also referred to as the retransmission time. In particular, each entry 26 includes a queue pair number field 28, a packet sequence number field 30, and a number of packets field 32. The queue pair number field 28 and the packet sequence number field 30 together form a packet identifier enabling the unique identification of the transmitted data packet.

Each entry 26 also includes an acknowledgment waiting bit 34 used to specify whether an acknowledgment has been received for the corresponding transmit packet. In particular, the HCA 12 includes a receive module (for receiving and processing packets) having an acknowledgment manager 36. The acknowledgment manager 36 is configured for resetting an acknowledgment waiting bit 34 to zero for a selected entry 26 to identify reception of an acknowledgment message for the corresponding transmit packet. Hence, the retransmission module 76 can identify whether a packet has received a corresponding acknowledgment by determining whether the corresponding entry 26 has an acknowledgment waiting bit 34 reset to zero; if the acknowledgment waiting bit 34 is set to "1", then the acknowledgment message has not been received yet by the HCA 12.

The retransmission manager 24 is configured for storing the entries 26 into the retransmission table 20 during each access cycle (i.e., after every "n" clock cycles). As described in detail below with respect to FIGS. 3A and 3B, the retransmission manager 24 writes the entries for the packet transmitted during the access cycle by accessing the retransmission table after every "n" clock cycles, reducing the number of access attempts to the retransmission table 20. In particular, the restriction of writing the entries at prescribed access cycles enables the memory size to be reduced, since any attempt to write an entry into the table 20 each clock cycle would result in a large memory size if the retransmission time "t" was a large number. Hence, the size of the table 20 can be reduced based on limiting the access to a prescribed number of clock cycles for each access attempt.

Figure 3A:
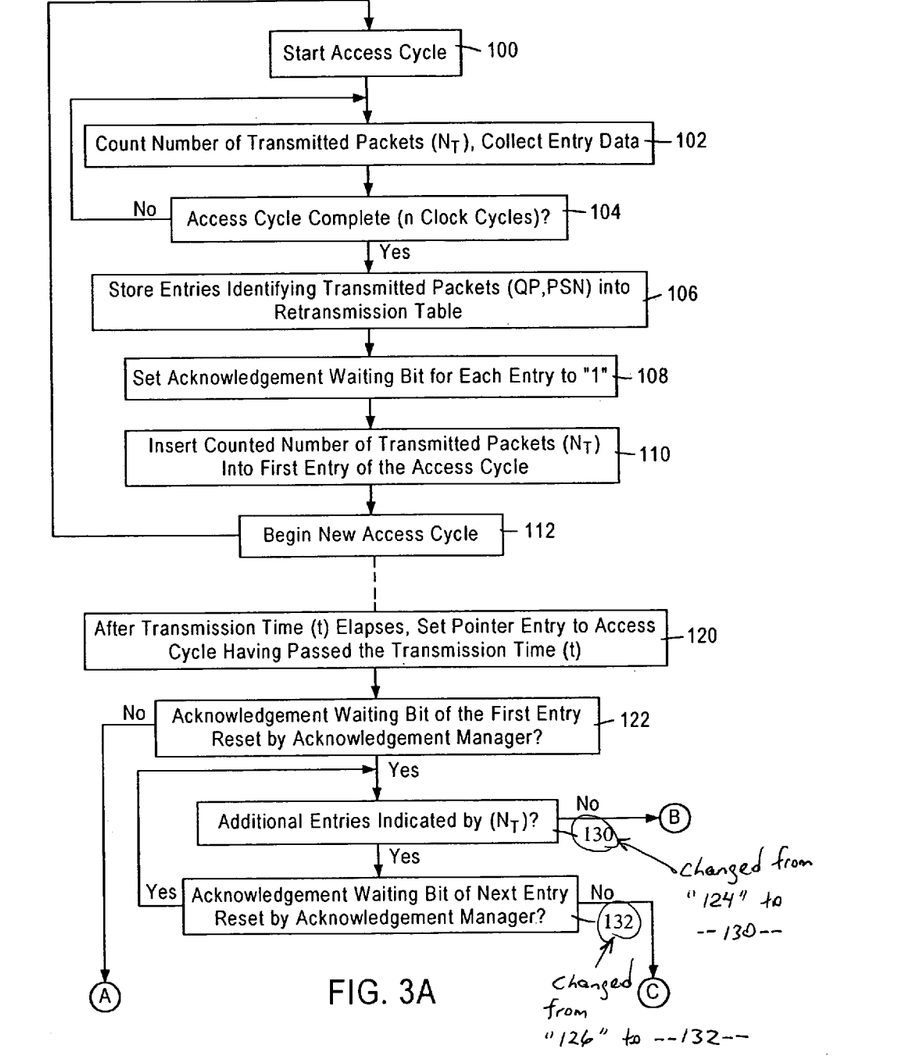
FIGS. 3A and 3B are diagrams summarizing the method of managing packets awaiting acknowledgment for selective retransmission according to an embodiment of the present invention.
Figure 3B:
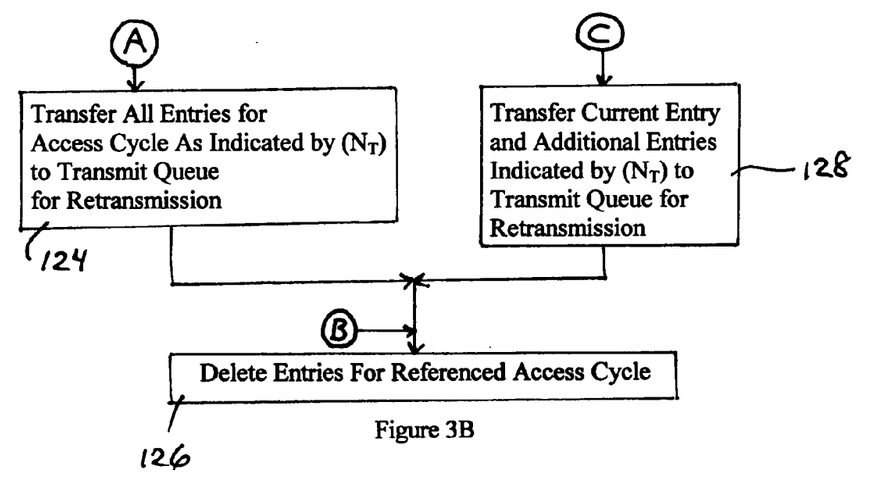

FIGS. 3A and 3B are diagrams illustrating the method for controlling retransmission according to an embodiment of the present invention. The method begins in step 100, wherein the access cycle starts by the retransmission manager 24 monitoring in step 102 the packets transmitted by the MAC 74 onto the network, and counting the number of transmitted packets using the counter 22. The retransmission manager 24 continues monitoring the packets having been transmitted until determining in step 104 that a prescribed number (n) of clock cycles have passed, indicating the access cycle is complete. Once the prescribed number of clock cycles have passed, the retransmission manager 24 stores in step 106 the entries 26 into the retransmission table 20 identifying the transmitted packets, based on the queue pair number field 28 and the packet sequence number field 30. The retransmission manager 24 also sets in step 108 each of the acknowledgment waiting bits 34 for each entry 26 written during the access cycle. Finally, the retransmission manager 24 inserts in step 110 the counted number of transmitted packets ($N_T$) into the number of packets field 32 for the first entry of the access cycle. The retransmission manager 24 can then begin the next access cycle in step 112.

As illustrated in FIG. 2, the retransmission manager writes four entries 26a, 26b, 26c, and 26d during access cycle N1 representing four (4) transmitted packets during the corresponding period of "n" clock cycles, where the entry 26a includes the number of transmitted packets ($N_T$=4) in the corresponding number of packets field 32.

The acknowledgment manager 36 independently monitors for acknowledgment messages from the network, and resets an acknowledgment waiting bit 34 for a selected entry 26 for a corresponding packet identified in the acknowledgment message.

The retransmission manager 24 also includes an independent process for determining after the retransmission time "t" (e.g., after a few milliseconds) whether any of the transmitted packets identified in the retransmission table 20 need to be sent back to the transmit queue 70 for retransmission. In particular, after the transmission time elapses, the retransmission manager 24 sets its internal pointer to access the cycle having passed the transmission time (t) in step 120. For example, the retransmission manager 24 would access the table entry 26a after the transmission time "t" had elapsed, coincident with the access interval $N_j$.

The retransmission manager 24 checks in step 122 whether the acknowledgment waiting bit 34 of the first entry 26a was reset by the acknowledgment manager 36. If the retransmission manager 24 determines the acknowledgment waiting bit for the first entry was not reset, the retransmission manager 24 transfers in step 124 all the entries 26a, 26b, 26c, and 26d stored during the access interval N1 to the transmit queue 70 for retransmission. In particular, the retransmission manager 24 parses the value of the number of packets field 32 to identify the number of entries for the corresponding access cycle N1, and retrieves the specified entries, independent of the respective values of the acknowledgment waiting bits 34. The transferred entries are then deleted for the referenced access cycle in step 126, clearing the retransmission table 20. As apparent from the foregoing, the data packets, upon retransmission, will be re-entered into the retransmission table 20 to repeat the acknowledgment waiting process.

Referring to step 122, if the retransmission manager 24 determines that the acknowledgment waiting bit of the first entry was reset, indicating reception of a corresponding acknowledgment message, the retransmission manager checks in step 130 whether the counted number of packets ($N_T$) indicates additional entries for the referenced access cycle. If no additional entries are found, the retransmission manager 24 deletes the entries in step 126, clearing the retransmission table 20.

If in step 130 additional entries are indicated by the counted number of packets ($N_T$), the retransmission manager 24 checks in step 132 if the corresponding waiting bit 34 has been reset by the acknowledgment manager 36; if the waiting bit 34 has been reset, indicating receipt of the acknowledgment message, the retransmission manager 24 checks for additional entries in step 130. However if in step 132 the acknowledgment waiting bit was not reset, the retransmission manager 24 transfers in step 128 the current entry 26 and any additional entries indicated by the number of packets value ($N_T$) to the transmit queue 70 for retransmission. The retransmission manager 24 then clears the entries in step 126.

According to the disclosed embodiment, transmitted packets awaiting receipt of an acknowledgment message can be efficiently managed and maintained using a retransmission table and the retransmission manager that periodically updates the table. The disclosed arrangement provides efficient table management techniques, minimizing the necessary size of the retransmission table.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a host channel adapter, the method comprising:
    first storing in a table, at an end of each access cycle by a retransmission manager, entries identifying respective packets wherein each entry identifies a corresponding one of said packets, said packets having been transmitted onto an InfiniBand™ network according to InfiniBand™ protocol and during said each access cycle according to an InfiniBand™-based service protocol requiring an acknowledgement message receipt within a prescribed time interval following transmission of the corresponding packet;
    resetting an acknowledgment waiting bit for a selected one of the entries by an acknowledgement manager in response to reception of an acknowledgment message identifying the corresponding packet identified by the selected one entry; and
    transferring the entries having a determined absence of the reset stored acknowledgment waiting bit upon expiration of the prescribed time interval to a transmit queue for retransmission onto the InfiniBand™ network according to InfiniBand™ protocol.

2. The method of claim 1, wherein the first storing step includes:
    counting during each access cycle a number of the packets having been transmitted during said each access cycle according to the service protocol;
    setting the acknowledgment waiting bit for each of the entries stored during said each access cycle; and
    inserting the counted number into a number of packets field within the entry corresponding to a first of the packets transmitted during said each access cycle.

3. The method of claim 2, further comprising determining the entries having the determined absence by:

accessing the entry for the first of the packets transmitted during an access cycle having passed the expiration of the prescribed time interval; and determining whether the accessed entry includes a reset acknowledgment waiting bit.

4. The method of claim 3, wherein the transferring step includes transferring the accessed entry and selected subsequent entries based on the counted number stored in the accessed entry to the transmit queue, independent of whether the selected subsequent entries have respective reset acknowledgment waiting bits.

5. The method of claim 4, further comprising deleting the entries having passed beyond the expiration of the prescribed time interval.

6. The method of claim 2, wherein the transferring step includes identifying the entries for transfer based on the counted number stored in the entry for the first of the packets.

7. The method of claim 1, wherein said each access cycle is defined by a prescribed number of clock cycles.

8. A host channel adapter comprising:

a table configured for storing entries identifying respective packets wherein each entry identifies a corresponding one of said packets, said packets having been transmitted onto an InfiniBand™ network according to InfiniBand™ protocol and according to an InfiniBand™-based service protocol requiring an acknowledgment message receipt within a prescribed time interval following transmission of the corresponding packet, each entry including a packet identifier, and an acknowledgment waiting bit for identifying whether the corresponding acknowledgment message has been received;

a transmit queue configured for identifying packets to be transmitted onto the InfiniBand™ network according to InfiniBand™ protocol;

an acknowledgment manager configured for resetting the acknowledgment waiting bit for a selected one of the entries identifying reception of an acknowledgment message for the corresponding packet; and a retransmission manager configured for storing in the table, at an end of each access cycle, the entries identifying the respective packets having been transmitted during said each access cycle, the retransmission manager transferring the entries having a determined absence of the reset acknowledgment waiting bit upon expiration of the prescribed time interval from the table to the transmit queue.

9. The apparatus of claim 8, further comprising a counter configured for counting during said each access cycle a number of the packets having been transmitted during said each access cycle according to the service protocol, the retransmission manager inserting the counted number into a number of packets field within the entry corresponding to a first of the packets transmitted during said each access cycle.

10. The apparatus of claim 9, wherein the retransmission manager accesses the entry for the first of the packets having been transmitted during an access cycle having passed the expiration of the prescribed interval, the retransmission manager transferring the accessed entry and selected subsequent entries based on the counted number stored in the accessed entry and identifying that the corresponding acknowledgment waiting bit has not been reset.

11. The method of claim 7, wherein the first storing step includes storing by the retransmission manager said entries, in a single storage transaction, into the table after said prescribed number of clock cycles.

12. The apparatus of claim 8, wherein said each access cycle is defined by a prescribed number of clock cycles, the retransmission manager is configured for storing said entries, in a single storage transaction, into the table after said prescribed number of clock cycles.

13. The apparatus of claim 8, wherein the host channel adapter is implemented as an application specific integrated circuit.

* * * * *